United States Patent Office 2,838,484
Patented June 10, 1958

2,838,484

PREPARATION OF PHOSPHORUS SULFIDE-HYDROCARBON REACTION PRODUCT

Robert E. Karll, Hammond, and Albert R. Sabol, Munster, Ind., assignors to Standard Oil Company, Chicago, Ill., a corporation of Indiana No Drawing. Application October 17, 1955
Serial No. 541,037

6 Claims. (Cl. 260—139)

This invention relates to improvements in the preparation of reaction products of a phosphorus sulfide and a hydrocarbon, and more particularly is directed to the reaction of a phosphorus sulfide and a hydrocarbon in the presence of a catalyst.

The reaction of a phosphorus sulfide and a hydrocarbon, and the neutralization of such reaction products with metal containing compounds, to prepare compositions useful as lubricating oil additives has been practiced extensively. U. S. patents relating thereto are U. S. 2,315,529 issued to Charles D. Kelso on April 6, 1943 and U. S. 2,316,080, 2,316,082 and 2,316,088 issued to Clarence M. Loane et al. on April 6, 1943. While in general no difficulty is encountered in reacting a phosphorus sulfide and a hydrocarbon as taught by the prior art, it has been found necessary to carry out the reaction at a temperature of between 400 to 450° F. for a period of time of about 5 hours; and even under these conditions unreacted phosphorus sulfide is generally found dispersed throughout the product and must be removed by filtration.

It is an object of this invention to provide an improved method of reacting a phosphorus sulfide and a hydrocarbon. It is a further object to provide a catalyst for the reaction of a phosphorus sulfide and a hydrocarbon. More specifically, it is an object to provide a relatively less expensive catalytic method of reacting a phosphorus sulfide and a hydrocarbon whereby the reaction may be carried out in shorter period of time and at a lower temperature than can be done by the prior art methods, while at the same time maintaining at least as high a sulfur to phosphorus ratio in the product as is obtainable by the prior art methods.

The improvement comprises conducting the reaction at a temperature in the range of from about 200° F. to about 450° F. and preferably in the range of from about 250° F. to about 350° F. for a period of time from about one to about ten hours, and preferably from about two to about four hours in the presence of a catalytic amount of a compound having the general formula:

RXH wherein R represents a member selected from the group consisting of alkyl radicals having from about 5 to about 20 carbon atoms, a phenyl radical; and alkyl substituted aryl radicals, wherein the alkyl substituents have from 1 to about 20 carbon atoms, and X represents a member selected from the group consisting of oxygen and sulfur. The compound represented by RXH should preferably have a boiling point above about 250° F. so that it will not vaporize too readily during the reaction, however, lower boiling compounds may be used if the reaction temperature is maintained below their boiling point at least in the initial stages of the reaction. Examples of compounds represented by RXH are such as octyl alcohol, octyl mercaptan, nonyl phenol, octadecyl thiophenol, and the like.

In the aforesaid patents, there is described the preparation of the products obtained by reacting a phosphorus sulfide with a hydrocarbon. Briefly, the hydrocarbon reactant is preferably a mono-olefin hydrocarbon polymer resulting from the polymerization of low molecular weight mono-olefinic hydrocarbons or iso-mono-olefinic hydrocarbons, such as proylenes, butylenes and amylenes, or the copolymers obtained by the polymerization of hydrocarbon mixtures containing iso-mono-olefins and mono-olefins of less than 6 carbon atoms. The polymers may be obtained by the polymerization of these olefins or mixtures of olefins in the presence of a catalyst such as sulfuric acid, phosphoric acid, boron fluoride, aluminum chloride or other similar halide catalysts of the Friedel-Crafts type.

A suitable polymer for the reaction with phosphorus sulfide is the product obtained by polymerizing in the liquid phase a hydrocarbon mixture containing butylenes and isobutylenes together with butanes and some $C_3$ and $C_5$ hydrocarbons at a temperature between about 0° F. and 30° F., in the presence of aluminum chloride. A suitable method for carrying out the polymerization is to introduce the aluminum chloride into the reactor and introduce the hydrocarbon mixture cooled to a temperature of about 0° F. into the bottom of the reactor and pass it upwardly through the catalyst layer while regulating the temperature within the reactor so that the polymer product leaving the top of the reactor is at a temperature of about 30° F. After separating the polymer from the catalyst sludge and unreacted hydrocarbons, the polymer is fractionated to obtain a fraction of the desired viscosity, such as for example, from about 80 seconds to about 2000 seconds Saybolt Universal at 210° F.

Essentially paraffinic hydrocarbons such as bright stock residuums, lubricating oil distillates, petrolatums, or paraffin waxes, may be used. There can also be employed the condensation products of any of the foregoing hydrocarbons, usually through first halogenating the hydrocarbons, with aromatic hydrocarbons in the presence of anhydrous inorganic halides, such as aluminum chloride, zinc chloride, boron fluoride, and the like.

Other preferred olefins suitable for the preparation of the hereindescribed phosphorus sulfide reaction products are olefins having at least 20 carbon atoms in the molecule of which from about 13 carbon atoms to about 18 carbon atoms, and preferably at least 15 carbon atoms, are in a long chain. Such olefins can be obtained by the dehydrogenation of paraffins, such as by the cracking of paraffin waxes or by the dehalogenation of alkyl halides, preferably long chain alkyl halides, particularly halogenated paraffin waxes.

Also contemplated within the scope of the present invention are the reaction products of a phosphorus sulfide with an aromatic hydrocarbon, such as for example, benzene, naphthalene, toluene, xylene, diphenyl and the like or with an alkylated aromatic hydrocarbon, such as, for example, benzene having an alkyl substituent having at least four carbon atoms, and preferably at least eight carbon atoms, such as long chain paraffin wax.

In accordance with the present invention, the phosphorus sulfide-hydrocarbon reaction product is prepared by reacting a phosphorus sulfide, preferably phosphorus pentasulfide, with a hydrocarbon of the type herein described at an elevated temperature of from about 200° F. to about 450° F. and preferably from about 250° F. to about 350° F. in the presence of a catalytic amount, i. e., from about ½% to about 20%, and preferably from about 2% to about 10%, of an alcohol, mercaptan, phenol, or thiophenol having the general formula

RXH wherein R represents a member selected from the group consisting of alkyl radicals having from about 5 to about 20 carbon atoms, a phenyl radical, and alkyl substituted aryl radicals, which alkyl substituents have from about 1 to about 20 carbon atoms, and X represents a member selected from the group consisting of oxygen and sulfur. Suitable alcohols are amyl alcohol, heptyl alcohol, octyl alcohol, octadecyl alcohol and the like. Suitable mercaptans are the sulfur analogs of the above alcohols. Suitable phenols are such as phenol, methyl phenol, dimethyl phenol, octyl phenol, dioctyl phenol, ethyl octyl phenol, octadecyl phenol, and the like and suitable thiophenols are the sulfur analogs of these phenols. A nonoxidizing atmosphere may be maintained above the reaction mixture as described more specifically in U. S. 2,315,529 and the reaction may be carried out in the presence of a sulfurizing agent as described in detail in U. S. 2,316,087 issued to J. W. Gaynor et al., April 6, 1943. The hydrocarbon may be reacted with from about 1% to about 50% and preferably from about 5% to about 25% by weight of a phosphorus sulfide, i. e., $P_2S_5$. It is preferable to use an amount that will completely react with the hydrocarbon so that no further purification becomes necessary. However, excess phosphorus sulfide may be used and subsequently separated from the product by filtering. The reaction is carried out for about 1 to about 10 hours or more and preferably for about 3 hours.

The following examples illustrate the lower temperatures necessary for carrying out the reaction in the presence of the catalyst as hereinbefore described and the shorter time required for such reaction to be completed.

*Example 1*

Butylene polymer (of about 1,000 molecular weight) 80.0%, 15.4% $P_2S_5$, 2.6% nonyl phenol and 2% sulfur was reacted at 320° F. The sulfur was added in 4 equal portions. The first portion was added during the initial mixture, second portion when a temperature of 300° F. was reached, third portion after first hour of reaction and fourth portion after second hour of reaction. The reaction was run for an additional hour after the final addition of sulfur for a total reaction time of 3 hours. A portion of the product gave a clear solution when dissolved in hexane which indicates the reaction was complete. The product contained 4.5% P and 8.9% S.

*Example 2*

A reaction similar to Example 1 was run using 76.0% polybutylene of about 1000 molecular weight, 15.1% $P_2S_5$, 6.9% nonyl phenol and 2% sulfur. The final product was also hexane clear and contained 4.5% P and 9.4% S.

*Example 3*

A reaction similar to Example 1 was run using tert octyl mercaptan in place of the phenol. The maximum temperature used in this reaction was 300° F. The product was clear in hexane solution.

*Example 4*

A reaction similar to Example 1 was run using octyl alcohol in place of the phenol. The maximum temperature used in this reaction was 300° F. The product was clear in hexane solution.

*Example 5*

For comparative purposes a reaction similar to Example 1 was run without the nonyl phenol. The product was not clear in hexane and contained large amounts of unreacted $P_2S_5$. Due to the gross amount of unreacted $P_2S_5$, P and S was not determined.

Additional runs were also made without catalyst and at temperatures of from 400 to 450° F. for periods of time up to 5 hours. Even at the higher temperatures and longer reaction periods without the presence of our catalyst, unreacted $P_2S_5$ was dispersed throughout the product and filtration was necessary. Phosphorus and sulfur content are about the same to slightly lower than obtained using our method as described above.

The above examples are illustrative of the lower reaction temperatures and the shorter reaction times necessary when employing our catalyst in the reaction of a phosphorus sulfide and a hydrocarbon. It is also apparent that the sulfur to phosphorus ratio in the products made in accordance with our invention is at least as high or higher than when made in accordance with the prior art methods.

The reaction products made in accordance with our invention are useful, per se, as additive and lubricant compositions used for the lubrication of internal combustion engines or as intermediate in the preparation of neutralized lubricant additives as described in detail in U. S. Patent Nos. 2,316,080 and 2,316,082.

Percentages given herein and in the appended claims are weight percentages unless otherwise noted.

While we have described our invention by reference to specific embodiments thereof, the same are given by way of illustration. Modifications and variations will be apparent from our description to those skilled in the art.

We claim:

1. The method of reacting a phosphorus sulfide and a viscous olefin polymer having a viscosity at 210° F. in the range from about 80 to about 2,000 SSU comprising heating and admixture of the olefin polymer and the phosphorus sulfide at a temperature from about 200° F. to about 450° F. for a period of time of from about one to about ten hours in the presence of from about 2% to about 10% by weight of a compound having the general formula:

$$RXH$$

wherein R represents a member selected from the group consisting of alkyl radicals having from about 5 to about 20 carbon atoms, the phenyl radical, and the alkyl substituted phenyl radical, which alkyl substituents have from about 1 to about 20 carbon atoms, and X represents a member selected from the group consisting of oxygen and sulfur.

2. The method of claim 1 wherein said olefin polymer is a butylene polymer.

3. The method of claim 1 wherein said phosphorus sulfide is phosphorus pentasulfide.

4. The method of claim 1 wherein RXH represents nonyl phenol.

5. The method of claim 1 wherein RXH represents octyl mercaptan.

6. The method of claim 1 wherein RXH represents octyl alcohol.

References Cited in the file of this patent

UNITED STATES PATENTS

| | | |
|---|---|---|
| 2,211,231 | Henderson | Aug. 13, 1940 |
| 2,606,182 | Musselman | Aug. 5, 1952 |
| 2,708,199 | Eby | May 10, 1955 |

OTHER REFERENCES

Pritzker, Nat. Petroleum News 37, R 1001–1010 (1945).